(12) United States Patent
Saarinen et al.

(10) Patent No.: US 9,528,849 B2
(45) Date of Patent: *Dec. 27, 2016

(54) SYSTEM FOR INTERACTION OF NAVIGATION AND CONNECTIVITY APPLICATIONS AND PERSONAL INFORMATION MANAGEMENT APPLICATIONS

(71) Applicant: Nokia Corporation, Espoo (FI)

(72) Inventors: Jouni Saarinen, Tikkakoski (FI); Matti Seppa, Jyvaskyla (FI); Pasi Kaipainen, Jyvaskyla (FI); Kimmo Kinnunen, Aanekoski (FI)

(73) Assignee: NOKIA CORPORATION, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,376

(22) Filed: Jan. 12, 2015

(65) Prior Publication Data
US 2015/0127252 A1    May 7, 2015

Related U.S. Application Data

(60) Continuation of application No. 13/570,868, filed on Aug. 9, 2012, now Pat. No. 8,972,181, which is a division of application No. 10/952,195, filed on Sep. 28, 2004, now abandoned.

(51) Int. Cl.
| | |
|---|---|
| *G01C 21/00* | (2006.01) |
| *G01C 21/36* | (2006.01) |
| *G01C 21/34* | (2006.01) |
| *G01C 21/20* | (2006.01) |

(52) U.S. Cl.
CPC .......... *G01C 21/3673* (2013.01); *G01C 21/20* (2013.01); *G01C 21/3476* (2013.01); *G01C 21/362* (2013.01); *G01C 21/3611* (2013.01)

(58) Field of Classification Search
CPC .................. G01C 21/3673; G01C 21/3476
USPC ....................................................... 701/516
See application file for complete search history.

(56) References Cited

U.S. PATENT DOCUMENTS

| | | |
|---|---|---|
| 5,327,066 A | 7/1994 | Smith |
| 5,627,549 A | 5/1997 | Park |
| 5,636,122 A | 6/1997 | Shah et al. |
| 5,765,123 A | 6/1998 | Nimura et al. |
| 5,948,040 A | 9/1999 | DeLorme et al. |
| 5,961,571 A | 10/1999 | Gorr et al. |
| 6,177,905 B1 | 1/2001 | Welch |
| 6,317,718 B1 | 11/2001 | Fano |

(Continued)

OTHER PUBLICATIONS

Delaney, "Garmin Rino 120 review", 2003, retrieved on Apr. 20, 2015 from http://www.cnet.com/products/garmin-rino-120-gps-receiver-two-way-radio-series/, 4 Pages.

(Continued)

*Primary Examiner* — Mark Hellner
(74) *Attorney, Agent, or Firm* — Ditthavong & Steiner, P.C.

(57) ABSTRACT

A system and method for providing fluent interaction between connectivity applications, personal information management applications and navigation applications. The present invention enables a user to launch navigation application directly from a "Contacts" application. This invention also enables the same result to be achieved in reverse, enabling direct access from a navigation application to contact information, eliminating the need for the user to manually access and enter information.

10 Claims, 2 Drawing Sheets

(56) References Cited

U.S. PATENT DOCUMENTS

| | | |
|---|---|---|
| 6,360,167 B1 | 3/2002 | Millington et al. |
| 6,515,595 B1 | 2/2003 | Obradovich et al. |
| 6,622,087 B2 | 9/2003 | Anderson |
| 6,882,290 B2 | 4/2005 | French et al. |
| 7,299,129 B2 | 11/2007 | Kalis et al. |
| 2001/0044321 A1 | 11/2001 | Ausems et al. |
| 2001/0045949 A1 | 11/2001 | Chithambaram et al. |
| 2002/0067308 A1 | 6/2002 | Robertson |
| 2002/0145561 A1 | 10/2002 | Sandhu et al. |
| 2002/0173344 A1 | 11/2002 | Cupps et al. |
| 2003/0023371 A1 | 1/2003 | Stephens |
| 2004/0054428 A1 | 3/2004 | Sheha et al. |

OTHER PUBLICATIONS

Garmin, "Rino 120 Owner's Manual", 2006, retrieved on Apr. 20, 2015 from http://www.uky.edu/~jmlhot2/courses/for480/Rino120_OwnersManual.pdf, 124 Pages.

Garmin, "GPS V Personal Navigator Owner's manual and reference guide", 2003, retrieved on Apr. 20, 2015 from http://gawisp.com/perry/gps-5/GPSV_OwnersManual.pdf, 91 Pages.

Office Action for U.S. Appl. No. 10/952,195, dated Jan. 28, 2008, pp. 1-10.

Office Action for U.S. Appl. No. 10/952,195, dated Jul. 29, 2008, pp. 1-11.

Office Action for U.S. Appl. No. 10/952,195, dated Jun. 6, 2007, pp. 1-7.

Office Action for U.S. Appl. No. 10/952,195, dated May 24, 2007, pp. 1-7.

Office Action for U.S. Appl. No. 10/952,195, dated Nov. 9, 2007, pp. 1-6.

SYSTEM FOR INTERACTION OF NAVIGATION AND CONNECTIVITY APPLICATIONS AND PERSONAL INFORMATION MANAGEMENT APPLICATIONS

CROSS-REFERENCE TO RELATED APPLICATIONS

The present application is a Continuation Application of U.S. patent application Ser. No. 13/570,868, filed Aug. 9, 2012, which is a Divisional Application of U.S. patent application Ser. No. 10/952,195, filed Sep. 28, 2004, the entirety of which is incorporated herein by reference.

FIELD OF THE INVENTION

The present invention relates generally to the field of location-based services. More particularly, the present invention relates to the interaction of location based services and personal information management applications.

BACKGROUND OF THE INVENTION

Location-based services and location-aware applications are becoming increasingly popular in the area of mobile devices such as cellular telephones. In particular, global systems for mobile communication and code division multiple access (CDMA) have become more accessible and popular with the general public in recent years. Currently, it is possible to use Bluetooth global positioning systems (GPS) with several cellular telephones, and a number of third party application developers are also currently developing applications in this area.

In addition to the above, a number of applications are available for aiding users in navigation and route planning. These applications use devices containing global positioning' systems to define the exact location of a mobile device. Although these systems can be quite useful, the usage of location information needs to be easy and convenient for the user in order for the average consumer to become comfortable taking full advantage of the technology. For example, when a user opens contact information for a person or a location, there needs to be a simple and straightforward system for the user to initiate the navigation process (including the accessing of digital map content) towards the particular contact. Currently, however, to complete the navigation process, the user must write down or copy the location information of the contact, initiate the navigation application, and enter the address manually before navigation could begin. Additionally, if the user begins with the navigation program, the user must manually enter the desired address before navigation is possible.

Furthermore, currently there is virtually no existing interaction between navigation applications and personal information management and connectivity applications. As a result, a user is required to first save the received landmark to a database, start the navigation application, and then locate the saved landmark from the database before navigation can be initiated.

SUMMARY OF THE INVENTION

The present invention addresses the above problems by providing a system wherein navigation applications are able to quickly and easily interact with personal information management and connectivity applications. The present invention permits a user to seamlessly move from finding a contact to entering a navigation application and vice versa without the difficulties described above. The system and method of the present invention therefore eliminate the need for the user to take multiple steps to initiate the navigation process, as well as eliminating the need to manually save and transfer contact information to a navigation program. These benefits greatly reduce the complexity involved in using such programs, providing improved access to such programs by a wide variety of end users. According to the principles of the present invention, a system and method is introduced for enabling the fluent interaction between connectivity and personal information management applications and navigation applications (including map content programs). The user of an electronic device is capable of launching a navigation application straight from a personal information management program. In other words, the user can start to navigate towards a currently highlighted contact. This principle also works in reverse, so that there is an access mechanism from the navigation application to contact information, so that the user does not have to manually enter an address before navigation is possible. Instead, the user can launch the personal information management program search the correct contact from there. Additionally, when a user receives location information (e.g. landmarks) from different sources, the user can quickly and easily start navigation straight from an inbox where received messages are stored.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
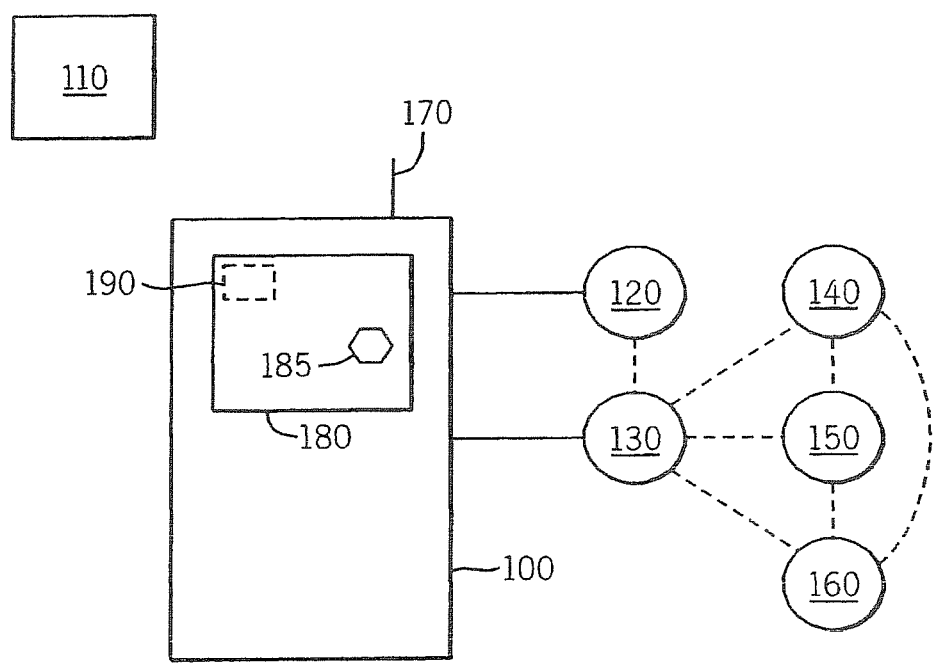
FIG. 1 is a representation of a mobile electronic device incorporating the features and principles of the present invention.

The present invention comprises a system and method for automatically associating navigation, personal information management, and connectivity applications to provide a simple method for initiating navigation functions in an electronic device. FIG. 1 discloses a generic electronic device at 100. The electronic device 100 can take a variety of forms, including, but not limited to, a portable telephone, a personal digital assistant, a small personal computer, or other products. The electronic device includes a processor 120 for processing information, as well as a memory unit 130 for storing the programs necessary for implementing the present invention. The processor 120 and the memory unit 130 are either directly or indirectly operatively connected to each other so that the processor 120 can process the programs stored in the memory unit 130. The electronic device 100 also includes a display 180, which can be used to exhibit graphics, alphanumeric characters, as well as computer icons 185 and/or options within drop-down menus 190 as is discussed hereinafter.

The memory unit 130 includes a connectivity program 140, a personal information management program 150 and a navigation program 160, all of which are operatively connected to each other to permit the interaction of the various programs. The connectivity program 140 permits the electronic device 100 to receive information from a remote location 110 through the use of a data communication link 170. The navigation program 160 is used to aid the user in tracking and directing the user to the remote location 110 once the remote location 110 has been identified. The personal information management program 150 can take a variety of forms. For example, the personal information management program 150 can include a system for managing a person's personal contacts, including protocols for a contact's electronic devices. The personal information management program 150 can also include a personal messaging system, such as an electronic mail system. All of the programming necessary to implement the present invention can be stored as computer program code within the memory unit 130.

Figure 2:
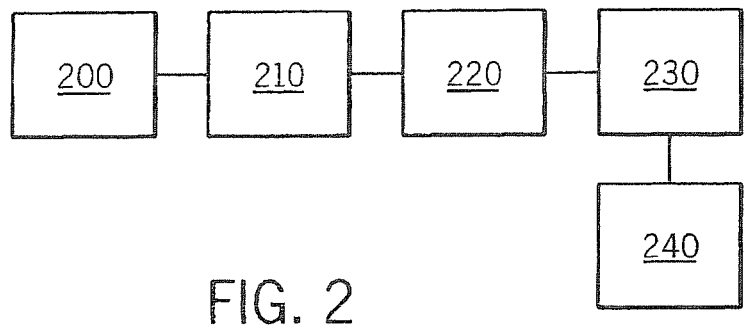
FIG. 2 is a representation of the steps involved in implementing a first embodiment of the present invention.

According to one embodiment of the invention, the navigation process is initiated as follows. As shown in FIG. 2, the process begins at step 200 when the user opens a personal information management program 150, such as "Contacts" application. Alternatively, contact information could be stored inside a messaging system, such as an electronic mail system. At step 210, the user selects the desired contact, with location information included therein. At step 220, the user selects a "start navigation" option. This option can be implemented in a wide variety of manners, including, but not limited to, having an icon 185 on the display inside the personal information management program 150, including an option in a drop-down menu 190, or other systems. At step 230, the navigation program 160 is automatically opened by the device and, at step 240, the navigation process for directing the user to the selected location is opened and initiated. In this situation, the navigation program 160 is started straight from the contact information inside the personal information management program 150, requiring virtually no effort from the user.

Figure 3:
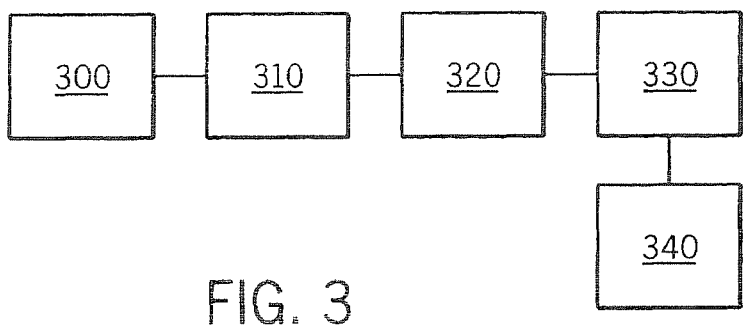
FIG. 3 is a representation of the steps involved in implementing a second embodiment of the present invention.

A second embodiment of the invention is depicted in FIG. 3. At step 300, the user opens the navigation program 160. At step 310, the user selects an option for the destination to be selected from the personal information management program 150. This option can also be implemented via an icon 185 on the display 180, through a drop-down menu, or other mechanisms known to those in the art. At step 320, the personal information management program 150 automatically opens. At step 330, the user selects the appropriate contact, with location information located therein. At step 340, the navigation program 160 retrieves the location information and the navigation process is initiated.

Figure 4:
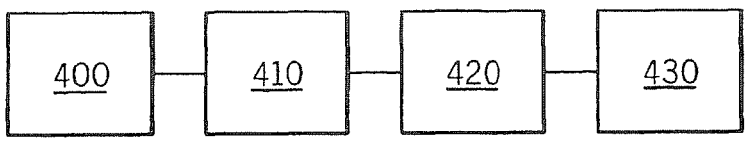
FIG. 4 is a representation of the steps involved in providing a user with "on the fly" information concerning location information that reaches the device during travel.

The present invention also permits the substantially simultaneous interaction between the navigation program 160 and the personal information management program 150 while in transit. This system is depicted in FIG. 4. At step 400 in FIG. 4, the process begins with the user continuously using the navigation program 160 for street navigation, for example navigating streets in the center of a large city. At step 410, the user comes into the range of defined location information (within 500 meters of the landmark, for example) and obtains an indication relating to that location, which is further attached to contact information stored in the personal information management program 150 of the user' mobile device. At step 420, the indication contains the portion of the information stored to Contacts, and the precise location information is highlighted on the map of navigation program 160. At step 430, the user is able to visit the location, which may have particular meaning for the user since it was already saved to the contacts of his or her mobile device.

Figure 5:
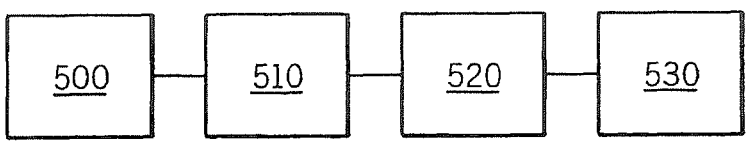
FIG. 5 is a representation of the steps involved in a mobile device obtaining landmark information and using the landmark information for navigation.

Furthermore, the present application allows a user to receive location information and immediately use it for navigation purposes. This process is depicted in FIG. 5. At step 500 of FIG. 5, the user's mobile device receives location (or landmark) information through the data communication link 170 over one of a wide variety of systems, including, but not limited to, Bluetooth, a multimedia messaging service, an infrared data association, or a hypertext transfer protocol, using the connectivity program 140. At step 510, the user observes that the landmark information has been received. At step 520, the user selects a "start navigation" option, which can be in the form of an icon 185, an option in a drop-down menu 190, or another form. At step 530, the navigation program 160 automatically opens, and navigation towards the location of the landmark is begun.

Implementation of the present invention results in a number of distinct advantages over conventional systems having completely independent navigation and personal information management programs 150. The present invention makes it is easier for a user of a mobile device to use location information for navigation. When location information is attached to existing applications, it is easier for manufacturers to introduce the new technology on a wide scale without requiring substantial learning by the end users.

While preferred embodiments have been shown and described herein, it should be understood that changes and modifications can be made to the invention without departing from the invention in its broader aspects. For example, but without limitation, contact information could be obtained from a wide variety of personal information management programs 150, including, but not limited to, messaging systems, address books, and other applications. Additionally many of the steps described above could be combined and/or modified in various embodiments of the invention. Various features of the invention are defined in the following Claims.

What is claimed is:

1. A method of navigation to a location comprising:
   initiating a navigation system of a portable electronic device, the portable electronic device comprising a processor and a memory including a contact application storing contacts, and wherein the contacts have attached location information corresponding to the contacts, wherein the processor causes the portable electronic device to:
   during use of the navigation system, receive an indication relating to location information for a particular contact of the contact application when the portable electronic device comes into a predetermined range of the location information for the particular contact, wherein the indication contains the location information attached to the particular contact of the contact application;
   display the location information attached to the particular contact of the contact application on a map of the navigation system; and initiate a navigation process of the navigation system to the displayed location information corresponding to the particular contact of the contact application.

2. A method as claimed in claim 1, wherein the contacts and attached location information corresponding to the contacts are additionally available in an electronic messaging system of the portable electronic device, and wherein the electronic messaging system and the navigation system of the portable electronic device are distinct and separate applications configured to run on the portable electronic device.

3. A method of claim 2, wherein the electronic messaging system comprises an electronic mail system.

4. A method of claim 1, further comprising:
actuating an input mechanism operatively connected to the navigation system,
wherein the actuation of the input mechanism directs a user to contact information of any contact.

5. A method of claim 1, further comprising:
initiating a communication connection to a remote terminal;
receiving landmark information from the remote terminal through the communication connection; and
automatically entering the landmark location information into the navigation system.

6. A non-transitory computer-readable storage medium carrying one or more sequences of one or more instructions which, when executed by one or more processors, cause a portable electronic apparatus to perform a method of navigation to a location, the portable electronic apparatus including a contact application storing contacts, wherein the contacts have attached location information corresponding to the contacts, the method comprising:
initiating a navigation system of the portable electronic apparatus;
during use of the navigation system, receiving an indication relating to location information for a particular contact of the contact application when the portable electronic apparatus comes into a predetermined range of the location information for the particular contact, wherein the indication contains the location information attached to the particular contact of the contact application;
displaying the location information attached to the particular contact of the contact application on a map of the navigation system; and
initiating a navigation process of the navigation system to the displayed location information corresponding to the particular contact of the contact application.

7. A non-transitory computer-readable storage medium of claim 6,
wherein the contacts and attached location information corresponding to the contacts are additionally available in an electronic messaging system of the portable electronic apparatus, and
wherein the electronic messaging system and the navigation system of the portable electronic apparatus are distinct and separate applications configured to run on the portable electronic apparatus.

8. A non-transitory computer-readable storage medium of claim 7, wherein the electronic messaging system comprises an electronic mail system.

9. A non-transitory computer-readable storage medium of claim 6,
wherein an input mechanism is operatively connected to the navigation system, and
wherein the apparatus is further caused, at least in part, to direct a user to contact information of any contact in response to actuation of the input mechanism.

10. A non-transitory computer-readable storage medium of claim 6, wherein the apparatus is further caused, at least in part, to:
initiate a communication connection to a remote terminal;
receive landmark information from the remote terminal through the communication connection; and
automatically enter the landmark location information into the navigation system.

* * * * *